April 10, 1956          G. ALLARD          2,741,681
ELECTRICAL CIRCUIT-BREAKERS
Filed March 11, 1952          2 Sheets-Sheet 1
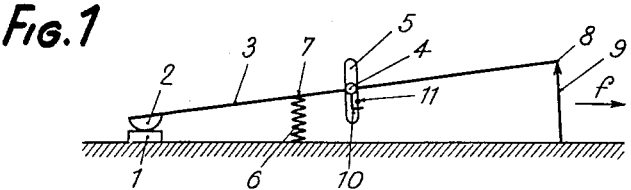
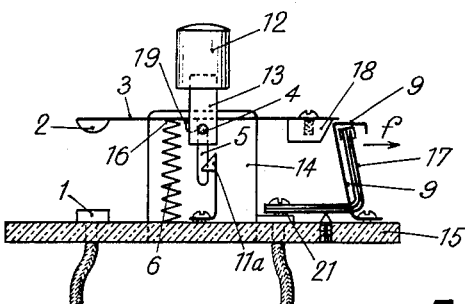
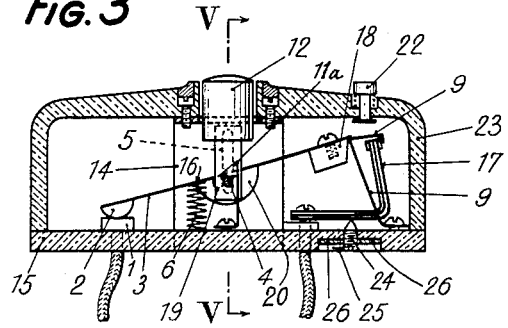
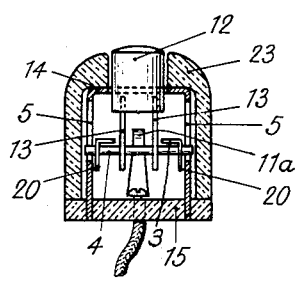
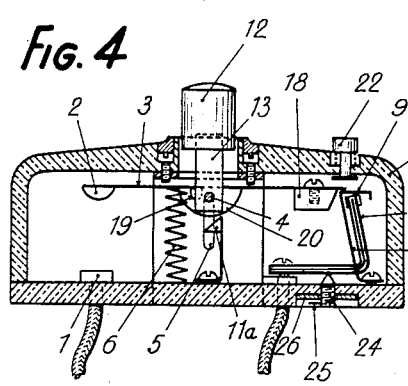
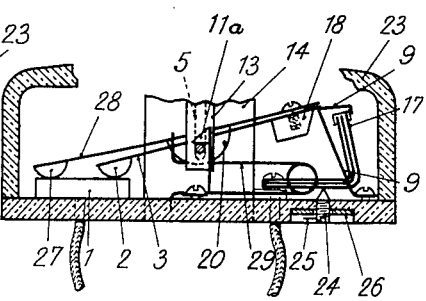
INVENTOR
GEORGES ALLARD
BY *Mock + Blum*
ATTORNEYS April 10, 1956     G. ALLARD     2,741,681
ELECTRICAL CIRCUIT-BREAKERS
Filed March 11, 1952     2 Sheets-Sheet 2
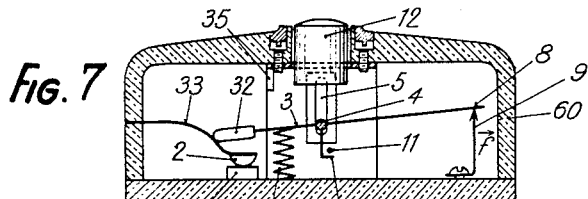
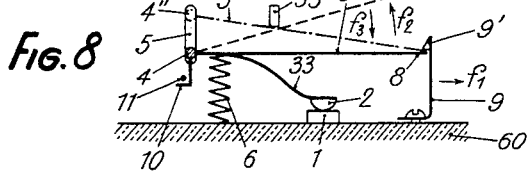
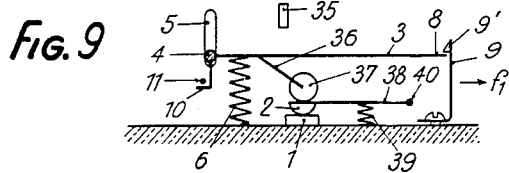
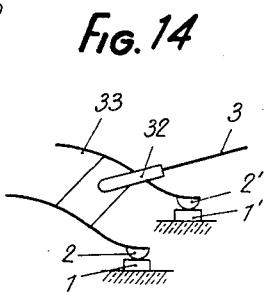
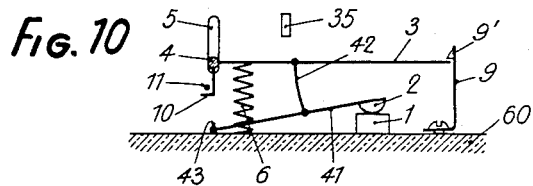
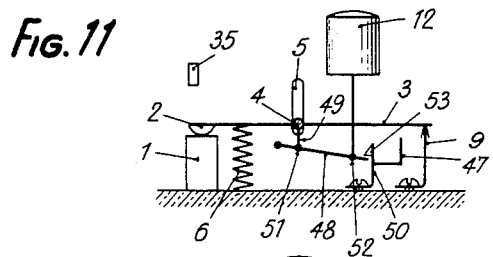
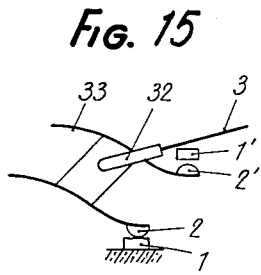
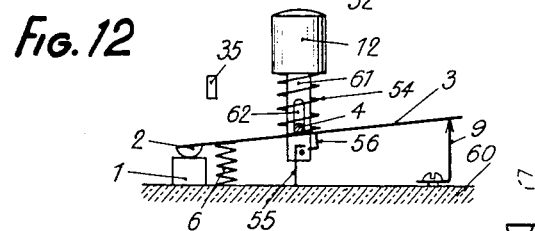
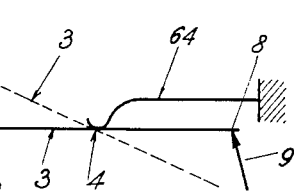
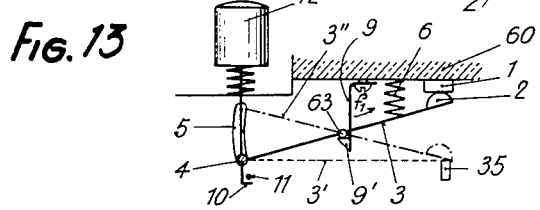
INVENTOR
GEORGES ALLARD
BY Mock + Blum
ATTORNEYS

United States Patent Office 2,741,681
Patented Apr. 10, 1956

2,741,681

ELECTRICAL CIRCUIT-BREAKERS

Georges Allard, Bois-Colombes, France

Application March 11, 1952, Serial No. 275,988

Claims priority, application France March 27, 1951

14 Claims. (Cl. 200—116)

This invention relates generally to electrical circuit-breakers or switches and more particularly to quick-break circuit-breakers of the so-called automatic cut-out type which open automatically when predetermined conditions occur. This opening may be caused by an overload, a short-circuit or a deficiency of voltage in the circuit controlled by the circuit-breaker. It may also be caused by an influence outside the circuit to be opened, for example in the case of overcurrent in another circuit, or through a clockwork or any type of temperature- or pressure-controlling or adjusting devices, etc. The circuit-breaker may then be reset by a simple and quick operation, provided that the cause of the release has been eliminated. Otherwise, it is not possible to hold the circuit-breaker in its circuit-closing position.

The mechanism of the quick-break automatic cut-out according to this invention is extremely simple and makes it possible to obtain devices that are both very sturdy and cheap to manufacture. Moreover, with this mechanism very small-sized apparatus may be produced that are nevertheless very accurate, easily adjustable, safe in operation and have a high current-breaking power. In addition, they are practically insensitive to vibration and shocks.

The apparatus according to this invention is of the type comprising a fixed contact and a movable contact responsive to a resilient force tending to move the contacts away from each other. This apparatus is characterized in that the movable contact is carried by a rod, lever or beam adapted simultaneously to rock or swing and to effect a movement of translation in the same plane, both movements occurring in directions such as to move the movable contact away from or towards the fixed contact, this lever or similar member being urged by a resilient force tending to move said contacts away from each other whilst on the side opposite to that carrying the movable contact the same lever bears against a movable check member the retraction of which is controlled at will by any desired cause such as overcurrent, variation in a predetermined characteristic of the electric current, or any external cause independent of the current, etc., the aforesaid lever carrying in addition an element adapted to lock it in the temporary pre-set position, this element being retracted automatically by the aforesaid rocking movement of the lever or beam.

According to another feature of the invention both movable check member and movable contact are positioned on either side of the fulcrum or pivot pin of the rocking or swinging movement of the lever.

As a result, the movable contact fast with one end of the lever or beam tends to move away from the fixed contact under the influence of the resilient force while in the pre-set position it is held thereagainst because the opposite end of the lever cannot rock since it bears on the aforesaid movable check member whereas the beam pivot pin is acted upon by a force urging it towards the fixed contact. The cause which determines the break retracts the check member, thereby releasing the corresponding end of the beam, so that the resilient force may rock the beam about its axis and move both pivot pin and beam away from the fixed contact. Thus, the beam starts rotating, thereby breaking the circuit and at the same time the pivot pin and the pre-setting member connected thereto are released.

If the pre-setting or locking member constituted for instance an external button, is held in the circuit-closing position the pivot pin of the beam will remain unmoved in its slide, but the opening will occur nevertheless through the mere rotation of the beam about this pivot pin.

By releasing the pre-setting or locking member the beam and pivot-pin assembly resumes its pre-set position. Thus, the position of the pre-setting member will also indicate whether the circuit-breaker is open or closed.

This device may easily be fitted with a releasing member in view of opening the circuit at will. It may also be combined either with an ordinary non-automatic circuit-breaker or with a convenience outlet.

The circuit-breaker according to the invention may also comprise additional or ancillary contacts adapted to open or close automatically other circuits during the operation of the device.

Other characteristic features of the invention will appear as the following description proceeds with reference to the accompanying drawings forming part of this specification and illustrating diagrammatically by way of example a few forms of embodiment of the invention. In the drawings:

Fig. 1 is a diagram showing the principle of the circuit-breaker mechanism according to the invention;

Fig. 2 is a somewhat more complete view showing the device in its released or circuit-opening condition;

Fig. 3 is a sectional view of another embodiment in its pre-set position;

Fig. 4 is a similar view showing the various members of the device in their released or circuit-opening positions;

Fig. 5 is a vertical section taken upon the line V—V of Fig. 3;

Fig. 6 shows in sectional and fragmentary view a modified embodiment of the beam;

Fig. 7 is a diagrammatical sectional view of a simple form of embodiment of the device;

Figs. 8 to 13 are similar views of other modified embodiments of the device;

Figs. 14 and 15 show diagrammatically two possible forms of two-pole contacts;

Fig. 16 is a diagram showing another form of embodiment.

Referring now to the diagram of Fig. 1 the apparatus comprises a fixed contact 1 and a movable contact 2 carried by a movable operating means 3 consisting of a metal or insulating beam, rod or blade. This rocking beam is pivotally mounted on a pivot pin 4 engaged in a groove 5. The beam 3 is acted upon by a spring 6 or similar member at a point 7 positioned intermediate the contact 2 and pivot pin 4. This spring constantly urges the beam upwards. The opposite end 8, of the beam bears on a removable stop means or check member 9 (consisting of a resilient leaf or a pawl) the retraction of which is effected either by a member responsive to predetermined overcurrent or overload conditions or by a mechanical member or device, or still by any other adequate or desired external cause acting in the direction of the arrow $f$.

The beam 3 carries a hook 10 or similar member adapted to engage a fixed part 11 carried for example by a part of the casing of the apparatus, the assembly of hook 10 and fixed part 11 constituting positive locking means intended to maintain movable supporting means 3 in the operative position.

The operation of this device is extremely simple.

By exerting a downward pressure from the outside, for instance by means of a push-button, lever or similar member (not shown), the beam 3 is depressed at its end carrying the movable contact 2 and the latter engages the fixed contact 1 whilst the opposite end 8 bears on the check member 9. In this position the hook member 10 engages the fixed part 11, thereby preventing any untimely release of the beam and securely holding it against motion.

Now if any external cause such as the deformation of a bimetallic strip or other effect occurs, the check member 9 will be retracted and the beam 3 allowed to rock about its pivot pin 4 under the pressure exerted by the spring 6. This rocking movement moves the contact 2 away from the fixed contact 1, thereby breaking the current, both contacts being assumed to be connected respectively with two leads from the circuit to be controlled as will be made clear presently. At the same time the hook 10 escapes from part 11 and the beam can move upwards along the groove 5.

From the foregoing it will be seen that if the operator keeps depressing a pushing means connected to the beam in order to hold the latter in its bottom position this pressure will not be able to prevent the beam from rocking and therefore the circuit from being broken.

It is obvious that the device according to the invention may very readily be operated automatically by causing any desired force to act upon the check member 9. This force may at will be subordinate either to a current characteristic or to an external cause independent of the current.

In Figs. 2 to 5 the same device is shown but with more details.

In the example of Figs. 1 to 5 the apparatus comprises a base having mounted thereon the fixed contact 1, the movable contact 2 being carried by the beam 3 mounted for both vertical and pivotal movements. The pivot pin 4 of the beam may be acted upon by a pushing means constituted for example by the push-button 12 through a pair of side lugs 13. This pivot pin 4 is mounted in a slide formed in a fixed member consisting of a pair of parallel metal plates or like members 14 inserted or embedded in the insulating base 15. An elastic hook 11a mounted on the base 15 constitutes the fixed part acting as part 11 but holding directly the pivot pin 4 in its depressed position when the device is pre-set instead of holding a hook carried by the beam 3. A coil or similar spring 6 bears with one end on the base 15 and with the other end on the beam 3 at a point 16 thereof positioned for example in the vicinity of the pivot pin 4. This spring tends to rotate the beam 3 about the pivot pin 4 and also urges the latter upwards in its groove 5.

In the pre-set position (Fig. 3) the beam 3 of the contact-breaker is supported at the end opposite to that carrying movable contact by movable support means or check member 9 and is held in its circuit-closing condition by the hook 11a anchored to the base 15 of the main casing 23. The automatic opening of the circuit-breaker is determined by the retraction of the check member 9. In the specific case illustrated in Figs. 2 to 5 the check member 9 is subordinate to a bimetallic strip 17 in which the current is caused to flow, the arrangement being such that an overcurrent of a predetermined value will deflect this strip in the direction of the arrow f. In this case the strip 17 will move the check member 9 in the same direction, thus releasing the corresponding end of beam 3 so that the resilient force exerted by the spring 6 will cause the beam 3 to rock about the pivot pin 4, thereby moving the contact 2 away from the fixed contact 1 and opening the circuit. Simultaneously, the hook 11a is pushed aside by the rocking movement of the stud 19 mounted on the beam, so that the rocking movement of the beam will disengage its pivot pin 4 from the hook 11a. As a result, the assembly consisting of beam 3, pivot pin 4 and push-button 12 if any may move upwards under the influence of spring 6. As the check member 9 has resumed its initial position, the circuit-breaker may be reset by merely depressing again the push-button 12.

Once the circuit-breaker has been pre-set, it is not possible to prevent it from operating by keeping the button 12 depressed. In fact, when the check member 9 has been acted upon by one of the aforesaid circuit-breaking causes and therefore moved in the release direction f the beam 3 will rock about its fulcrum even if the push-button 12 is kept in its depressed position, and the movable contact 2 will move away from the fixed contact 1, thereby opening the circuit.

This circuit may be as follows (see Figs. 2 and 3): Current is fed to the fixed contact 1 and flows across movable contact 2, beam 3, side lugs 20 of beam 3, metal plates 14, screw 21 connected to one end of the U-shaped bimetallic strip 17, the current outlet being at the opposite end of this strip.

The apparatus may be provided with a release button 22 carried by the main casing 23. By depressing this button 22 the check member 9 is moved aside and the breaking action occurs.

The apparatus may very easily be adjusted in view of causing it to be released at the desired time by means of an adjusting screw 24 engaged in the base 15. By screwing in or out the adjusting screw 24 the position of the bimetallic strip 17 may be varied in relation to the check member 9. This adjusting screw 24 carries an index 25 registering with a graduated scale 26 embedded in the base 15.

The masses of the movable contact 2 and balance piece 18 are designed to match the shape of the beam so that the center of gravity of the beam will be substantially coincident with the axis of the pivot pin 4, thereby rendering the device vibration and shock-proof.

On the other hand the electrical circuit arrangement is such that any arcing occurring between contacts 1 and 2 is automatically blown out to the outside of the mechanism. The substantial breaking gap combined with this blow-out action impart a high breaking power to the apparatus.

According to a modified embodiment illustrated in Fig. 6 the movable contact 2 is positioned very close to the pivot pin 4 of beam 3 and the breaking action proper is effected by a spark-arrester 27 carried by a small leaf spring 28. In this case a hairpin spring 29 is substituted for the aforesaid coil or similar spring 6.

With this modified device a relatively high contact pressure may be obtained at the movable contact 2 for a relatively low pressure applied at the opposite end 18 of the beam.

When the beam 3 is caused to rotate about its pivot pin 4 during a release the circuit break occurs firstly at the main contact 2 which strikes the leaf spring 28 and any arcing will take place between the spark-arrester 27 and the fixed contact 1. As a result the contact surface of contact 2 is constantly kept in clean condition. The beam 3 may be connected to the pivot pin 4 either resiliently or not and caused to carry this pin along in its rocking or rotational movement, so that at the end of the pre-setting stroke the pivot pin 4 will be stuck in a notch provided for example inside the groove or slide 5.

When the beam is released and allowed to rock in the opposite direction the pivot pin 4 is released automatically and may move freely in the slide.

The device according to the invention offers the following advantages: high contact pressure, long break gap, ultra-quick break produced by the impact of main contact 2 against leaf spring 28, thereby preventing the contacts from sticking, high sensitiveness, and constantly clean main contact surface.

Similarly, another obvious modification may consist in incorporating the check member 9 in the strip 17, the latter acting in this case as a check member.

In the example illustrated in Fig. 7 the apparatus comprises a fixed contact 1 and a movable contact 2 carried by a resiliently arm-like means such as a deformable rod 33. A beam 3 is pivotally mounted on a pin 4 movable along a groove 5. A hook means 10 makes it possible to hold the movable assembly 3, 4 against motion by engaging from the rear a finger 11 or like element provided on the casing 60. One end of the beam 3 carries an insulating pad 32 bearing on the rod 33 and maintaining the contacts 1, 2 in engagement with each other. The other end 8 of beam 3 bears on a check member 9.

A spring 6 urges the elements 32 and 33 away from each other.

A stop 35 for defining the topmost position of beam 3 is provided on the casing 60.

In this diagram as well as in other figures of the drawings some of the members designed to act upon the beam 3 such as the push-button or members responsive to changes intervening in the current, such as bimetallic strips, are omitted for the sake of clarity. Besides, such members are well known to anybody conversant with the art and a few examples thereof are given in the preceding description of figures.

The operation of the device illustrated in Fig. 7 is extremely simple. The force produced by the cause which is to release the mechanism acts in the direction of the arrow $f$ so that the corresponding end of the beam is released by the check member 9 and rocked by the spring 6 assisted by the resilient rod 33. Thus, the insulating pad 32 moves away from the rod 33 and the movable contact 2 carried thereby moves away from the fixed contact 1. At the same time hook 10 is released from finger 11 and pivot pin 4 is abruptly urged upwards along groove 5. On completing this rocking and upward movement the beam 3 engages the stop 35 and its end 8 is brought back in its pre-set position above the check member 9.

In the embodiment of Fig. 7 the breaking circuit 1, 2 is insulated from the other parts of the apparatus and no current flows through neither the sliding nor the hooking members thereof. This feature is particularly advantageous for breaking relatively high current values.

Fig. 8 shows a similar device except that the contacts 1, 2 are positioned intermediate the pivot pin 4 and the check member 9. Due to the reversal in the direction of motion of the beam 3 relative to the preceding examples the check member 9 is formed with a retaining nose 9'.

The operation of this modified device is as follows: The check member 9 is again moved by the desired force in the direction $f_1$. Under these circumstances, beam 3 is allowed to rock in the direction of arrow $f_2$ until it engages finger 35 (position 3', dashed line). Contacts 1 and 2 are separated. As the hook 10 is free the pivot pin 4 urged by spring 6 rises in the groove 5 from the position 4", thereby producing another rocking movement of the beam in the direction of the arrow $f_3$ (position 3", dots and dashes) and bringing its end 8 beneath the nose 9'.

With the arangement illustrated diagrammatically in Fig. 8 circuit-breakers having very small over-all dimensions may be obtained.

In the example of Fig. 9 the beam 3 is disposed in the same manner as in Fig. 8 but instead of engaging the contact 2 directly a roller 37 carried by an arm 36 is interposed therebetween; the roller bears on the movable contact 2 carried in turn by an arm 38 pivotally mounted at 40 and urged upwards by a spring 39.

The example illustrated in Fig. 10 is another modified embodiment of the circuit-breaker according to the invention wherein the movable contact 2 is carried by a rod 41 pivoted at 43. A link 42 connects beam 3 with rod 41.

The embodiments illustrated in Figs. 9 and 10 make it possible to construct small-sized devices ensuring nevertheless a relatively high pressure between contacts 1 and 2 with a relatively low pressure of the end 8 of beam 3 against the nose 9' of check member 9.

Fig. 11 shows another embodiment wherein the groove 5 is again positioned between the contacts 1, 2 and check member 9. In this case the movable contact 2 is carried by the beam 3 pivotally mounted on a pivot pin 4. The retaining device 10, 11 is replaced by a link means such as lever 48 pivoted at 51 on a rod 49 fast with the pivot pin 4. The push-button 12 or equivalent member acts at 52 on the lever 48 which may be held against motion by a nose 53 formed on a lever 50 carrying an arm 47 as shown.

The operation of this device is extremely simple, as in the preceding cases. In case of overcurrent for example the lever 9 escapes from the beam 3 and the latter is rocked about the pivot pin 4 whilst the lever 48 is released by the movement of the hook arrangement 50, 53 because the beam 3 engages the arm 47. The push-button 12 and its cooperating pivot pin 4 in groove 5 are both moved upwards.

With the embodiment of Fig. 11 devices having extremely small dimensions may be obtained because for any relatively short stroke of the movable contact 2 in relation to the fixed contact 1 a relatively long stroke of the control button 12 will occur.

Fig. 12 relates to a device wherein the beam 3 is retained in a resilient manner; in other words, a resilient connection is provided between the control button 12 and beam 3. In this case the button 12 is formed with a downward extension 61 having formed therein a slot 62 engaged by the pivot pin 4. Thus, the button 12 may move in relation to this pin by an amount equal to the length of the slot 62. Of course, the pivot pin 4 engages the groove 5 formed in the fixed casing of the device, this slide being omitted here for the sake of clarity in the drawing. A spring 54 is disposed between push-button 12 and beam 3. As a result of this arrangement the pressure between contacts 1 and 2 is independent of the pressure applied on the control button 12 since a resilient element is interposed between this button and beam 3.

The release is produced by the fact that the beam 3 is formed with a stud 56 which, when the beam is rocked, engages the hook 55 and moves it to a release position.

With the embodiment illustarted in Fig. 12 devices may be obtained wherein the pressure between the contacts is independent of that exerted on the control button.

Fig. 13 illustrates another embodiment wherein the check member 9 controlled by the phenomenon designed to operate the circuit-breaker is positioned between the pivot pin 4 and the movable contact or contacts 2. In this example the beam 3 is formed with a stud or similar element 63 cooperating with the check member 9—9'. In the initial phase of the release the beam 3 subsequently assumes positions 3' (dotted line) and 3" (dots and dashes) in which stud 63 bears again on check members 9. It will be noted that the groove 5 may consist of a curved slot for facilitating the rocking movement of the beam.

Fig. 14 shows diagrammatically the manner in which the contacts 1 and 2 may be doubled in view of forming a multipole switch all the poles of which are opened simultaneously through the action of a single beam.

Fig. 15 illustrates a convenient way of simultaneously obtaining with a single beam the opening of a pair of contacts 1, 2 and the closing of another pair 1', 2'.

Of course, the arrangement illustrated in Figs. 14 and 15 are applicable to any desired embodiment of the device according to the invention.

In the embodiment shown in Fig. 16 the pivot pin 4 slidably engaged in groove 5 is replaced with a resiliently deformable bearing consisting for example of an arm 64 on which the beam 3 is caused to bear.

Of course, the invention is by no means restricted to the various forms of embodiment shown and described herein which are given merely as examples, for many other modifications may be brought thereto without departing from the spirit and scope of the invention as claimed.

What I claim is:

1. In an electric circuit breaker or like apparatus adapted for an automatic operation in the case of an overcurrent of a short-circuit or of any other external cause having a predetermined value, a main casing, at least one stationary contact and at least one movable contact, movable operating means for displacing said movable contact, two pivoting means for said operating means, one of which consisting of a pivot and of a groove slidably containing said pivot, the second being constituted by a removable stop-means located at and cooperating with the end part of the said operating means opposite the end thereof carrying the movable contact, said stop-means contacting said operating means, when close-circuit conditions are prevailing, means sensitive to the overcurrent, acting on said stop means, pushing means engaging said operating means, and causing them to pivot about said pivoting means so as to produce the displacement of said operating means; resilient means acting on said operating means in a direction in which the movable contact is urged away from the stationary one, positive locking means cooperating with said pivot adapted to prevent any displacement of said operating means when the contacts are engaged, said locking means being automatically locked and released by the proper rotating movement of said operating means to and from its closed position.

2. Apparatus according to claim 1 wherein the said pivot coincides substantially with the center of gravity of said operating means.

3. Apparatus according to claim 1 wherein the said resilient means acts on said operating means at a point situated between said pivot and the movable contact.

4. Apparatus according to claim 1 wherein said locking means comprises hook means connected to said operating means and a stationary element on said casing cooperating with said hook.

5. Apparatus according to claim 1 wherein adjusting external means are provided for timing the breaking effect.

6. Apparatus according to claim 1 wherein said groove means consist of a slide provided with a notch cooperating with said pivot.

7. Apparatus according to claim 1 wherein more than one movable contact is provided, one of said contacts being carried by a rod, whereas the said operating means corresponds to at least another movable contact, is interrupted and comprises an end portion acting on said rod.

8. Apparatus according to claim 1 wherein said movable contacts are situated on said operating means intermediate said pivot and said removable stop means.

9. Apparatus according to claim 14 wherein a resilient connection is provided between the said pushing means and pivot.

10. Apparatus according to claim 9 wherein the said resilient connection consists of a longitudinal hole provided in said extension and of a spring member acting between said pushing means and operating means.

11. Apparatus according to claim 10 wherein the said locking means consist of a stud and a hook provided on said operating means and on the main casing and cooperating when said a operating means is rocked to release said extension.

12. Apparatus according to claim 1 wherein the movable contact is carried by auxiliary arm-like means, said operating means acting on said arm-like means.

13. Apparatus according to claim 1 wherein the said locking means consist of link means pivotally connected to said pivot and pushing means and of hook means operatively engaging said link means.

14. Apparatus according to claim 1 wherein said pushing means comprise an extension containing said pivot.

References Cited in the file of this patent

UNITED STATES PATENTS

| Re. 22,218 | Von Hoorn | Nov. 3, 1942 |
| 1,416,263 | Campbell | May 16, 1922 |
| 2,053,629 | Peterson | Sept. 8, 1936 |
| 2,148,880 | Sattler | Feb. 28, 1939 |
| 2,184,372 | Von Hoorn | Dec. 26, 1939 |
| 2,335,082 | Platz | Nov. 23, 1943 |
| 2,504,513 | Fleming | Apr. 18, 1950 |
| 2,519,297 | Stump et al. | Aug. 15, 1950 |
| 2,563,174 | Kitman | Aug. 7, 1951 |
| 2,563,175 | Kitman | Aug. 7, 1951 |
| 2,633,515 | Locher | Mar. 31, 1953 |